(12) United States Patent
Henderson

(10) Patent No.: US 8,968,481 B2
(45) Date of Patent: Mar. 3, 2015

(54) PIG RECEIVER

(75) Inventor: Scott Henderson, Johnshaven Angus (GB)

(73) Assignee: National Oilwell Varco, L.P., Houston, TX (US)

(*) Notice: Subject to any disclaimer, the term of this patent is extended or adjusted under 35 U.S.C. 154(b) by 0 days.

(21) Appl. No.: 13/813,607

(22) PCT Filed: Aug. 31, 2011

(86) PCT No.: PCT/EP2011/065011
§ 371 (c)(1),
(2), (4) Date: Jan. 31, 2013

(87) PCT Pub. No.: WO2012/028649
PCT Pub. Date: Mar. 8, 2012

(65) Prior Publication Data
US 2013/0125323 A1    May 23, 2013

(30) Foreign Application Priority Data

Aug. 31, 2010  (EP) .................................... 10174706

(51) Int. Cl.
  *B08B 9/04*    (2006.01)
  *B08B 9/032*   (2006.01)
  *F16L 55/46*   (2006.01)

(52) U.S. Cl.
  CPC .............. *B08B 9/0321* (2013.01); *F16L 55/46* (2013.01)
  USPC ............ 134/22.18; 15/3.5; 15/3.51; 15/3.52; 15/104.062; 134/22.1; 134/22.11

(58) Field of Classification Search
  USPC ............... 15/104.062, 104.061, 104.063, 3.5, 15/3.51, 3.52; 251/326, 327, 328, 329; 137/15.07, 268; 134/22.1, 22.11, 134/22.12, 42
  See application file for complete search history.

(56) References Cited

U.S. PATENT DOCUMENTS 2,481,422 A * 9/1949 Haynes et al. ................. 166/156
3,146,477 A * 9/1964 Bergman et al. ......... 15/104.062
(Continued)

FOREIGN PATENT DOCUMENTS

| EP | 0819629     | 1/1998  |
|----|-------------|---------|
| WO | WO91/17386  | 11/1991 |
| WO | WO96/05128  | 2/1996  |

OTHER PUBLICATIONS

International Search Report, PCT/EP2011/065011, mailed Jul. 10, 2011.

*Primary Examiner* — Gary Graham
*Assistant Examiner* — Michael Jennings
(74) *Attorney, Agent, or Firm* — Winston & Strawn LLP

(57) ABSTRACT

An apparatus for receiving a pig (12) comprising: a receiver housing (2) arranged to enable connection to a pipeline; a pig retention mechanism (4) mounted within said receiver housing (2), said pig retention mechanism (4) arranged such that it is operable to retain the pig (12) within the housing (2); a first sealing member (6) operable to seal the portion of the receiver housing (2) through which the pig (12) can be removed from the apparatus; a second sealing member (5) operable to seal the portion of the housing (2) that connects said receiver (1) to the pipeline; a fluid inlet (7); and a fluidization and transportation device (8) arranged to receive the fluidized debris, wherein the apparatus is arranged such that, in use, pressurized fluid is introduced into the enclosed interior of the housing (2) via the fluid inlet in order to fluidize debris which is then removed from the receiver housing (2) via the fluidization and transportation device (8).

12 Claims, 2 Drawing Sheets

(56) References Cited

U.S. PATENT DOCUMENTS

| | | | |
|---|---|---|---|
| 3,548,438 A * | 12/1970 | Ghormley | 15/104.062 |
| 3,564,634 A * | 2/1971 | Hood | 15/104.062 |
| 4,750,941 A * | 6/1988 | Gerich | 134/22.12 |
| 5,051,193 A * | 9/1991 | Cummings, Jr. | 210/752 |
| 5,208,936 A * | 5/1993 | Campbell | 15/104.061 |
| 5,853,266 A | 12/1998 | Parkinson et al. | |
| 6,029,302 A | 2/2000 | Coura et al. | |
| 6,098,231 A * | 8/2000 | Smith et al. | 15/104.061 |
| 6,370,721 B1 * | 4/2002 | Torres et al. | 15/104.061 |
| 7,025,142 B2 * | 4/2006 | Crawford | 166/311 |
| 7,827,646 B2 * | 11/2010 | Pruett | 15/104.061 |
| 8,225,809 B2 * | 7/2012 | Krywitsky | 137/15.07 |
| 2006/0064829 A1 * | 3/2006 | Houldey et al. | 15/104.061 |
| 2008/0202594 A1 * | 8/2008 | Krywitsky | 137/15.07 |
| 2009/0083922 A1 * | 4/2009 | Watson et al. | 15/104.062 |
| 2009/0140133 A1 * | 6/2009 | Abney | 250/253 |

\* cited by examiner

PIG RECEIVER

The present invention relates to an apparatus and method for cleaning a pig receiver.

The term 'pig' refers to a pipeline inspection gauge used to perform various operations within a pipeline without stopping the flow of product through the pipeline. Operations performed by pigs include internal cleaning of the pipeline, physically separating different liquids being transported in the pipeline and inspecting the condition of pipeline walls. Pigs can be used for maintaining pipelines that transfer a wide variety of products, including oil and gas. Pigs can be used following product transfer through a pipeline, such as at the end of a batch process, or whilst product is flowing through the pipeline in a continuous process.

The pig is inserted into the pipeline via a launcher, which is then sealed such that the pressure of the product in the pipeline forces the pig along the pipeline. As the pig travels along a length of pipeline it comes into contact with solid and/or liquid debris collected within the pipeline and it pushes the debris along until it reaches a pig receiver.

According to conventional apparatus and methods, once the pig is received in the receiver, the receiver is isolated from the pipeline (usually by the use of valves) and the receiver is opened to enable the pig to be manually extracted so that both the pig and the interior of the pig receiver can be cleaned.

The disadvantage of this conventional process is that, depending upon the contents of the pipeline, the pig and the interior of the pig receiver may be coated in debris, such as sand, scale, etc coated in oil, gas and strongly acidic or alkaline compounds, which may be extremely hazardous to the operator and present a serious risk to health. There is also a risk of loss of containment of the debris into the local environment around the receiver when the contaminated pig receiver is opened and the pig is removed. Furthermore, the debris that is removed from the contaminated pig receiver and the pig must be treated and disposed of in separate downstream processes; this is inconvenient, time-consuming and expensive.

Consequently, there exists a need for an improved pig receiver that enables the majority of the debris to be removed from the interior of the pig receiver, and from the pig, prior to the receiver being opened.

In the present invention there is provided an apparatus for receiving a pig comprising: a receiver housing arranged to enable connection to a pipeline; a pig retention mechanism mounted within said receiver housing, said pig retention mechanism arranged such that it is operable to retain the pig within the housing; a first sealing member operable to seal the portion of the receiver housing through which the pig can be removed from the apparatus; a second sealing member operable to seal the portion of the housing that connects said receiver to the pipeline;

a fluid inlet; and a fluidisation and transportation device arranged to receive the fluidised debris, wherein the apparatus is arranged such that, in use, pressurized fluid is introduced into the enclosed interior of the housing via the fluid inlet in order to fluidise debris which is then removed from the receiver housing via the fluidisation and transportation device.

According to the present invention there is also provided a method for cleaning a pig receiver comprising:

sealing a portion of the housing of said receiver which is arranged to enable a pig to be removed from the housing;

sealing a portion of the housing of said receiver which is arranged to enable connection to a pipeline;

introducing pressurised fluid into the enclosed interior of the receiver housing via a fluid inlet in order to fluidise debris within the receiver housing; and removing fluidised debris from the receiver housing via a fluidisation and transportation device.

The invention may be arranged such that it directs fluid to the pig receiver housing, the pig itself, or both.

The pig receiver of the present invention is advantageous over conventional pig receivers of the prior art in a number of ways.

Since the interior of the pig receiver and, optionally, the pig itself, are cleaned whilst the receiver housing is sealed, the majority of the debris is removed prior to opening the receiver, thereby minimising exposure of operators to potentially hazardous debris material.

The debris is removed from the receiver via the fluidisation and transportation device, and can be directed to downstream processing and/or purification facilities. This enables greater control of the containment, processing and disposal of debris and has efficiency, cost and health benefits.

The invention will now be exemplified with the aid of the following drawings.

Figure 1:
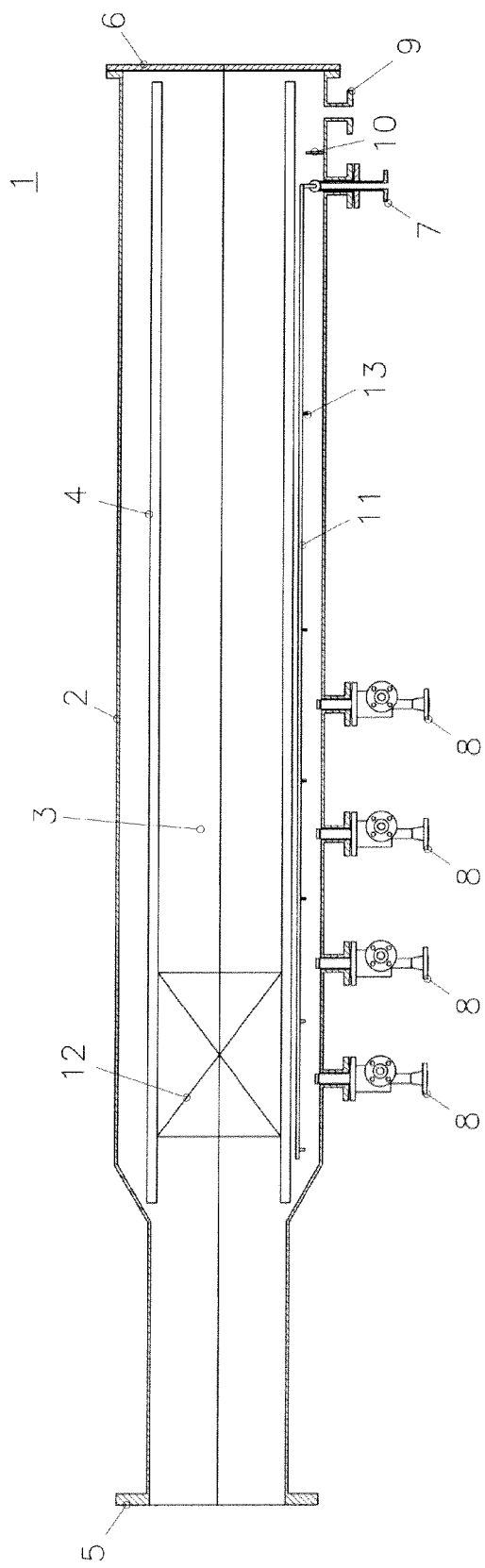
FIG. 1 shows an example of a pig receiver configured in use for cleaning a pig.
Figure 2:
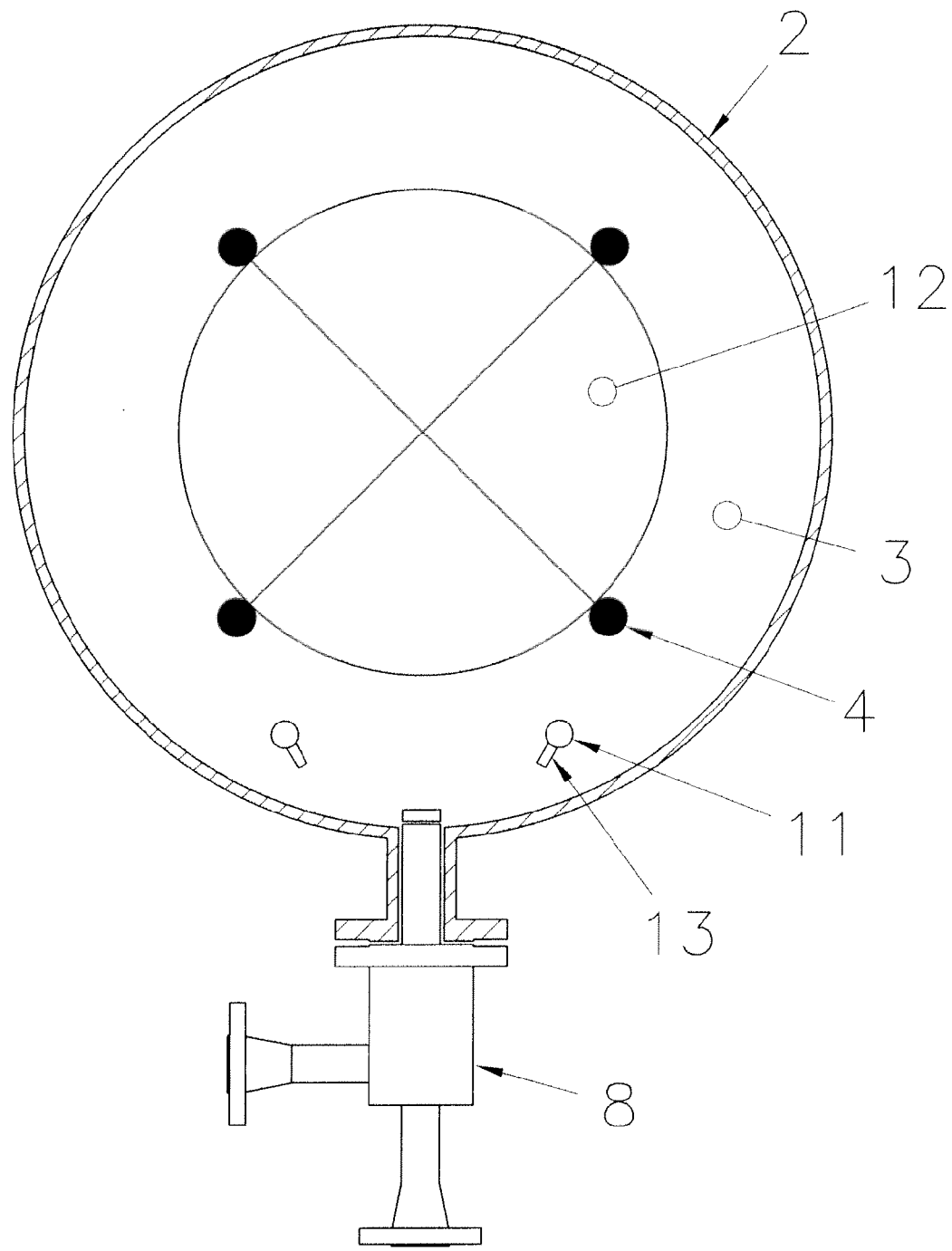
FIG. 2 shows a cross-sectional end view through the pig receiver (blind flange not shown for clarity).

As illustrated in FIG. 1, the receiver 1 is arranged to enable connection to a pipeline (not shown) and comprises a receiver housing 2 defining an interior chamber 3 within which, in this example, a pig 12 is received and mounted horizontally. The receiver housing 2 comprises a seal member 5 for connection to a process pipeline, and a seal member 6 for extraction of the pig. A fluid inlet 7 is coupled to a fluid source (not shown) and extends vertically through the base of the receiver housing 2 into the interior chamber 3. A fluidisation and transportation device 8 is mounted externally to the receiver housing 2 and is coupled to a downstream processing system (not shown).

The pig receiver illustrated in FIG. 1 further comprises the optional features of a fluid outlet 9, which extends from the interior chamber 3 through the base of the receiver housing 2 and is coupled to a drainage system (not shown), and a weir plate 10, which is located between the fluid inlet 7 and the fluid outlet 9.

In the example of the present invention illustrated in FIG. 1, a pig 12 travels along a pipeline coupled to the receiver 1 and enters the interior chamber 3 of the receiver housing 2 past the seal member. The pig retention mechanism 4 is positioned such that, in use, it extends around the pig 12, in order to retain the pig 12 in the middle of the interior chamber 3. Once the pig 12 is in position, the seal member is sealed, thereby enclosing the pig 12 within the interior chamber 3, and the receiver 1 is isolated from the pipeline.

In the example of the present invention illustrated in FIG. 1, fluid inlet 7 supplies fluidisation jetting nozzles 13 positioned such that coverage extends along the base of the receiver housing 2 and such that their position does not hinder operation or removal of the pig. The fluid inlet 7 is operable such that the flow of fluid through the inlet can be controlled by manual or automatic means. Fluid is introduced into the interior chamber 3 via the fluid inlet 7 to the jetting header pipe and to the jetting nozzles 13 to fluidise the debris within the receiver housing, including debris associate with the pig 12. The fluid may be any suitable fluid (e.g. water) and is preferably pressurized to maximise the removal and fluidisation of debris.

Fluidised debris leaves the interior chamber 3 via the fluidisation and transportation device 8. In the example of the present invention illustrated in FIG. 1, excess fluid leaves the interior chamber 3 via the fluid outlet 9. In this example, a weir plate 10 located between the fluid inlet 7 and the fluid outlet 9 minimises the carryover of excess solid debris, thereby preventing blockage of the fluid outlet 9. If the receiver comprises a plurality of fluid outlets then there may also be a plurality of weir plates and the weir plate(s) may be substituted with a filter or grille arrangement.

The example of the present invention illustrated in FIG. 1 comprises a fluidising jet header pipe 11 mounted internally within the receiver housing 2. The fluidising jets 13 further aid the fluidisation of debris.

In the example of the present invention illustrated in FIG. 1, a plurality of fluidisation and transportation devices 8 are mounted externally to the receiver housing 2 such that they are arranged to receive the fluidised debris from the interior chamber 3. Said devices 8 are positioned such that coverage is along the outer body of the receiver housing 2, and furthermore are installed such that they do not hinder the operation or removal of the pig. Fluidised debris can exit the interior chamber 3 via the device 8, which is coupled to a downstream processing system (not shown). The device 8 transports the solid and liquid phases of the contaminated waste to for further treatment.

In a preferred embodiment, fluidised debris exits the receiver housing via the fluidisation and transportation device and excess fluid exits via the fluid outlet.

Suitable fluidisation and transportation devices include Tore® technology devices.

In operation the seal member 6 will be sealed and the seal member 5 opened to allow the pig to be received in the interior chamber 3 of the housing. The seal member 5 is then closed and the outlet 9, in this example, opened to reduce the pressure in the interior chamber 3 to a level below that of the pipeline by removal of material from the pipeline which has been carried into the chamber 3 with the pig 12.

Cleaning fluid (in this example water) may then be introduced under pressure via the inlet 7 to surround the pig 12 and fill the chamber 3. Cleaning can then be carried out and material removed either through the fluidisation and transportation devices 8, the outlet 9, or a combination thereof. When cleaning fluid has been removed through outlet 9 the weir 10 will retain remaining debris and fluid which can then be removed through the fluidisation and transportation devices 8.

Once the interior of the pig receiver and, optionally, the pig, have been cleaned the fluid inlet 7 is closed (for example, after a pre-determined length of time) and excess water drains out of the interior chamber 3 via the device 8 and/or the fluid outlet 9. The configuration of the receiver housing 2 enables the pig to be extracted past the seal member 6. Once removed from the receiver the pig 12 and the interior of the pig receiver can undergo further cleaning, if required.

The present invention enables the removal of the majority of debris from the interior of the pig receiver, and from the pig 12 itself, whilst the pig 12 is enclosed in the receiver housing. Furthermore, the present invention facilitates the subsequent removal of the fluidised debris from the housing, thereby negating the need for operators to come into contact with the debris. As such, it is advantageous over pig receivers of the prior art because it provides a more efficient, cleaner and safer means of cleaning pigs and pig receivers and processing the waste debris.

The invention claimed is:

1. An apparatus for receiving and cleaning debris off a pig comprising:
   a receiver housing arranged to enable connection to a pipeline;
   a pig retention mechanism mounted within said receiver housing, said pig retention mechanism arranged such that it is operable to retain the pig within the housing;
   a first sealing member operable to seal the portion of the receiver housing through which the pig can be removed from the apparatus;
   a second sealing member operable to seal the portion of the housing that connects said receiver to the pipeline;
   a fluid inlet;
   a jet header pipe mounted internally within the receiver housing in fluid communication with the fluid inlet and having jetting nozzles configured to fluidise debris in the receiver housing and off the pig; and
   a fluidisation and transportation device attached to the receiver housing arranged to receive fluidized debris from the receiver housing,
   wherein the apparatus is arranged such that, in use, pressurized fluid is introduced into the enclosed interior of the receiver housing via the fluid inlet and the jetting nozzles in order to fluidise debris which is then removed from the receiver housing prior to the opening of the receiver housing, via the fluidisation and transportation device.

2. The apparatus of claim 1, wherein the fluidisation and transportation device is mounted externally on the receiver housing.

3. The apparatus of claim 1, further comprising a fluid outlet arranged to remove excess fluid from the receiver housing.

4. The apparatus of claim 3, further comprising a weir plate located between the fluid inlet and the fluid outlet.

5. The apparatus of claim 1, wherein the pressurized fluid is water.

6. The apparatus of claim 1 arranged such that pressurised fluid can be introduced when the pig is in position within the receiver housing.

7. A method for cleaning a pig receiver comprising:
   sealing a portion of a housing of said receiver which is arranged to enable a pig to be removed from the housing;
   providing a pig retention mechanism mounted within the housing of the receiver
   sealing a portion of the housing of said receiver which is arranged to enable connection to a pipeline;
   introducing pressurised fluid into the enclosed interior of the receiver housing via a fluid inlet in order to fluidise debris within the receiver housing;
   fluidising debris within the receiver housing whilst the receiver housing is sealed; and
   removing fluidised debris from the receiver housing via a fluidisation and transportation device prior to opening the receiver housing.

8. The method of claim 7, further comprising removing excess fluid from the receiver housing via a fluid outlet in the receiver housing.

9. The method of claim 8, further comprising preventing solid debris from entering the fluid outlet by a weir plate located in the receiver housing between the fluid inlet and the fluid outlet.

10. The method of claim 7, wherein debris is further fluidised by a fluidised jet header pipe and associated jet nozzles mounted internally within the receiver housing.

11. A method according to claim 7, wherein the pig is in position within the receiver housing when the pressurised fluid is introduced.

12. A method according to claim 7, wherein the fluid is water.

\* \* \* \* \*